Dec. 13, 1966  D. F. WOOR ETAL  3,291,260
VEHICLE LIFTS OR HOISTS
Filed June 25, 1965  6 Sheets-Sheet 3

INVENTORS
Denis Frederick Woor
Ronald Edward Farnfield
Thomas Eric Greenwood
BY
Mason, Kolehmainen,
Rathburn & Wyss
ATTORNEYS

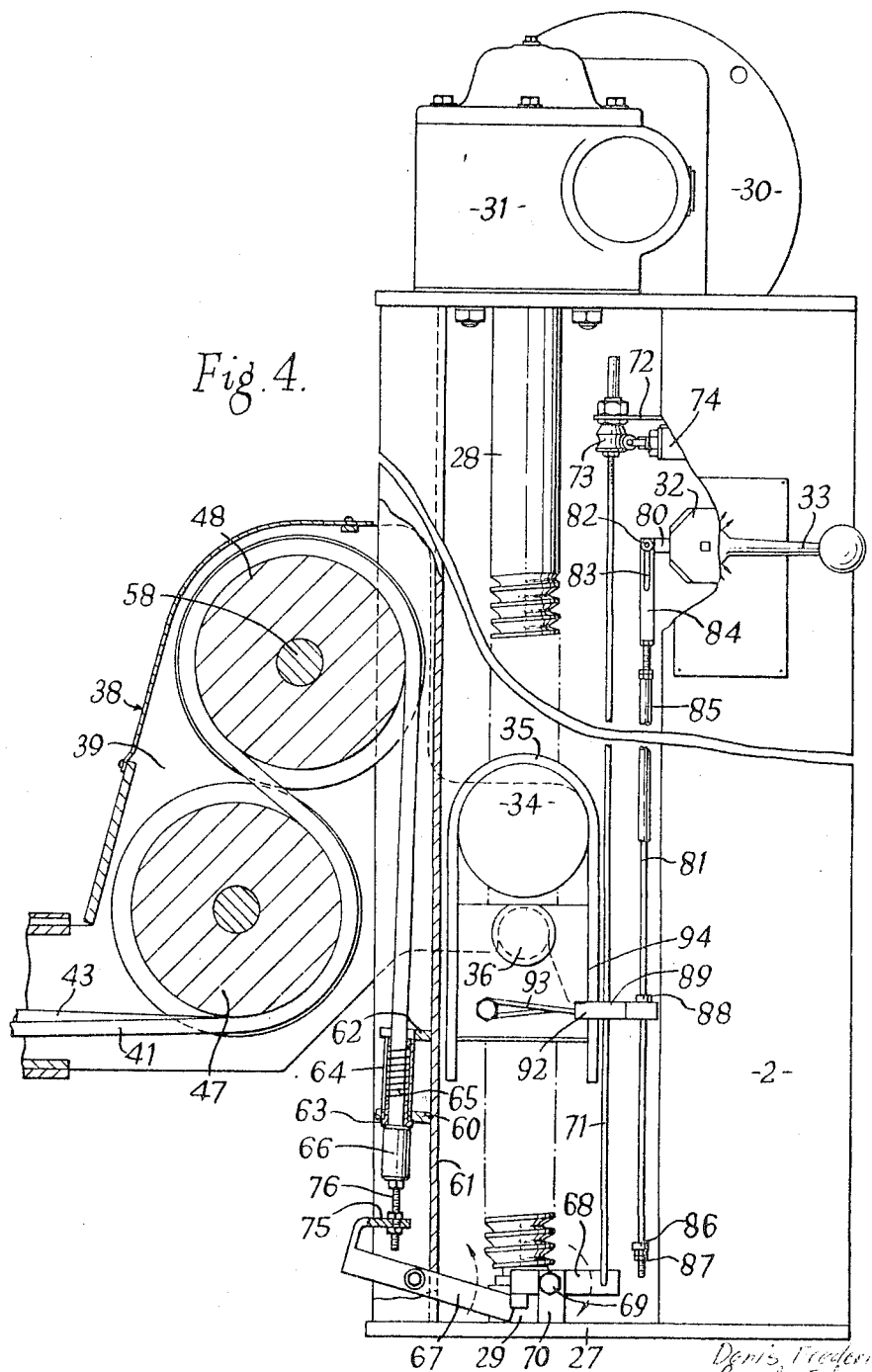

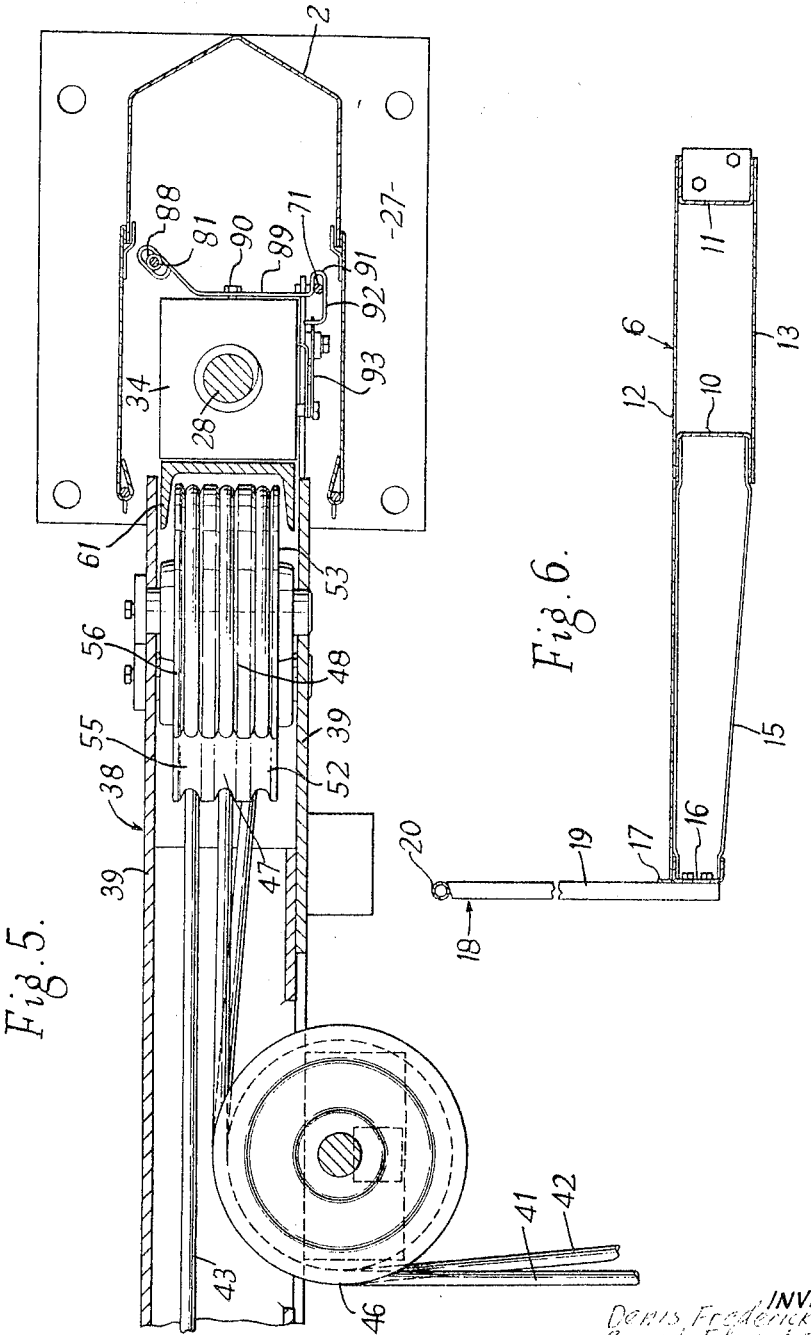

Dec. 13, 1966  D. F. WOOR ETAL  3,291,260
VEHICLE LIFTS OR HOISTS
Filed June 25, 1965  6 Sheets-Sheet 6

INVENTORS
Denis Frederick Woor
Ronald Edward Penfield
BY Thomas Eric Greenwood

ATTORNEYS

United States Patent Office 3,291,260
Patented Dec. 13, 1966

3,291,260
VEHICLE LIFTS OR HOISTS
Denis Frederick Woor, Derriford, Plymouth, and Ronald Edward Farnfield and Thomas Eric Greenwood, Laira, Plymouth, all of Devon, England, assignors to Tecalemit (Engineering) Limited, Devon, England
Filed June 25, 1965, Ser. No. 467,026
Claims priority, application Great Britain, June 26, 1964, 26,613/64
3 Claims. (Cl. 187—8.47)

The invention relates to vehicle lifts or hoists, hereinafter referred to as "lifts," and it is particularly applicable to such lifts which are used for raising vehicles in order that the latter may be worked on from underneath.

The invention is especially concerned with lifts having a platform which is supported at a number of points, usually at its four corners, by means which include a number of cables, and it has amongst its chief objects the provision of safety mechanism which will guard against damage or injury being caused as a result of breakage of one of these cables or by the platform engaging some obstruction whilst it is being lowered.

The invention accordingly provides a lift for vehicles and the like, comprising a platform, means including a plurality of cables for supporting the platform in a substantially horizontal position, a drive for raising and lowering the platform and safety mechanism which includes one or more actuating members, means responsive to operation of the actuating member or one of them to stop the drive, a plurality of end members each of which is connected to one end of one of the cables, and means biassing each of the end members against the tension of its cable in a direction to operate the actuating member or one of them, such that a loss of tension in one of the cables causes its end member to operate the said actuating member to stop the drive.

The invention further provides further safety mechanisms which are fitted at points, such as the corners of the platform, which are remote from the drive, for preventing downward movement of the platform at these points in the events of one of the cables becoming slack as a result of breakage of the cable or obstruction of that part of the platform during downward travel of the latter. Each of these safety mechanisms may include a braking device, for supporting and preventing downward movement of that part of the platform, and means, which may include a roller or other member bearing against the cable, for rendering the braking device operative should the cable become slack.

The invention also provides improvements in the construction of the platform and of the drive for raising and lowering it.

Further features of the invention will become apparent from the following description taken in conjunction with the accompanying drawings. In the drawings:

FIGURE 4 is another view to a larger scale, partly broken-away and in section, showing parts of the same drive and safety mechanism;

FIGURE 5 is a horizontal sectional view, taken through the mechanism shown in FIGURE 4;

FIGURE 6 is a detail sectional view showing parts of the lift platform;

Figure 1:
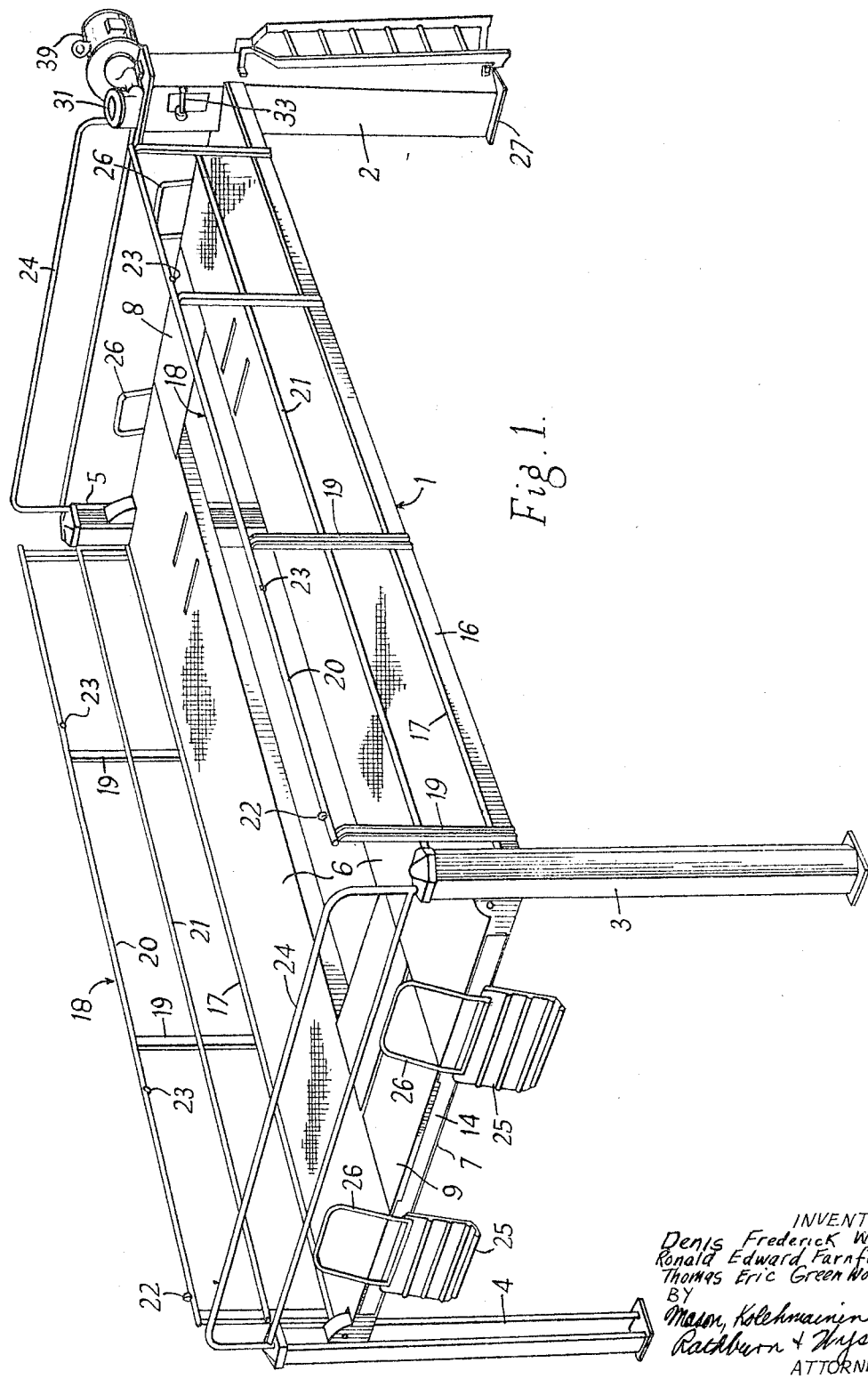
FIGURE 1 is a general view, partly diagrammatic, showing a vehicle lift exemplifying the invention.

Referring to the drawings and more particularly to FIGURE 1, the lift shown comprises a platform 1 which is supported at its corners by four columns 2, 3, 4 and 5. The column 2 is a drive column and includes a drive mechanism for raising and lowering the column, as well as safety mechanism which represents an important feature of the invention.

The drive mechanism in the column 2 acts directly on one corner of the platform 1 to support and raise or lower the latter, whilst it is connected with the remaining corners of the platform and with the columns 3, 4 and 5 by an arrangement of cables which will be described.

In the construction shown the platform 1 comprises a pair of runways 6 which are spaced from each other to leave a central opening between them, through which opening access can be had to the underside of a vehicle which has been driven onto and raised by the platform. The runways 6 are connected at their ends by means of cross members 7 and the spacing between them is such that the wheels of any vehicle for which the lift is designed will rest on the runways, whilst the latter are made wide enough to provide walk-ways along the sides of the vehicle. The platform is also made long enough to enable walk-ways 8 and 9 to be provided around the ends of the vehicle.

As is best shown in FIGURE 6, each of the runways 6 is formed of a pair of longitudinal members 10 and 11. These are preferably of channel section and they are joined together by top and bottom plates 12 and 13, respectively. These plates, which may be spot welded to the members 10 and 11, form with the latter a structure of closed box section which is very strong and which, in the case of one of the runways, provides protection for supporting cables (to be described) where these pass along the platform.

Figure 3:
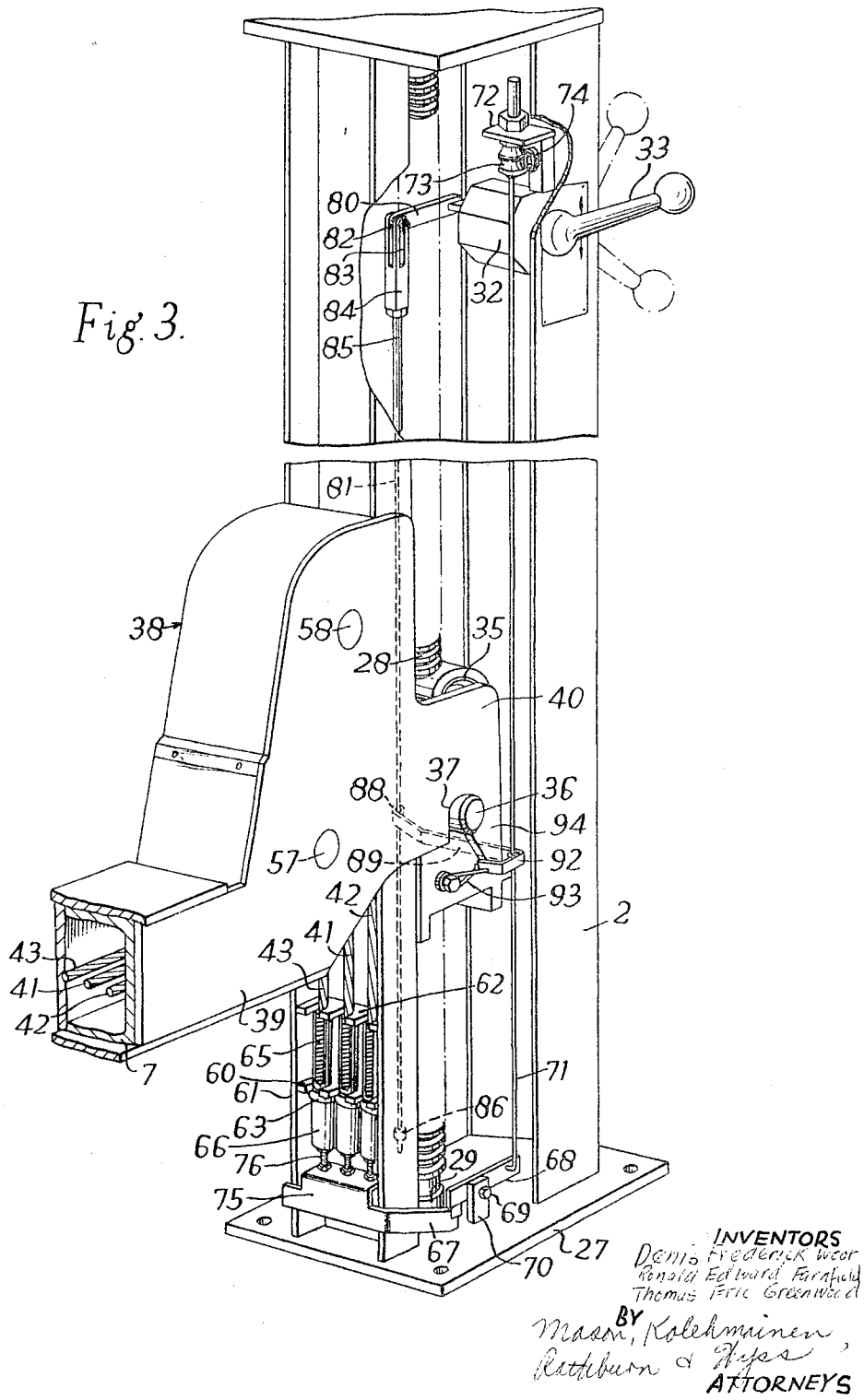
FIGURE 3 is a isometric view, partly broken-away and in section and to a layer scale, showing parts of the drive and safety mechanism of the lift.

As is best shown in FIGURE 3, the cross members 7 are preferably made of channel section, the outer sides of these members being closed along most of their length by plates 14 (FIGURE 1) to form passages in which the cables are protected where they run transversely of the platform.

The cross members 7, and also the longitudinal members 10 and 11, may be made of sheet steel which is bent or folded to channel shape, steel reinforcing plates, such as the plates 14, which may be spot welded to the top and bottom flanges of the members, being fitted where necessary. This construction is cheaper than using hot rolled girders for these members.

The top plate 12 of each runway extends outwardly beyond the member 10 to form one of the walkways, where the top plate is supported by the cross-members 7 and by a number of outriggers 15 of channel or other suitable section.

The ends of the cross-members 7 and of the outriggers 15 are joined by side members 16 of channel or other section. These like the members 10 and 11, may be formed of sheet steel and they are secured by welding or other means.

The outer side edges of the top plates 12 are preferably turned up to provide lips 17, which prevent tools from rolling or being kicked off the walkways.

Guard rails 18 may be provided along the two sides of the platform 1. These may be formed of uprights 19 which are connected by upper and lower rails 20 and 21. As shown, the upper rails 20 may form air lines, each of these rails being provided with an air inlet connection 22 and with one or more outlets or take-off points 23, to which type inflators, spray guns or other portable pneumatic tools or equipment may be connected.

End rails 24 may also be provided at the ends of the platform 1.

Flaps 25, which may be provided with handles 26, are pivoted to the ends of the runways 6 and form ramps when the platform 1 is in its lowest position, nearest the ground.

Referring now to FIGURES 3 to 5, the drive column 2 is preferably formed of sheet steel which is bent to the shape shown to form a column, which is of closed box section except for one of its inner faces. It is mounted on a base plate 27, which may be secured to the ground by bolts, studs or other means.

Suspended from the top of the column 2 by means of a suitable bearing is a vertical drive screw 28, the lower end of which is journalled in a bottom bearing 29. The drive screw 28 can be driven in either direction by an electric motor 30 which drives it through reduction gearing, indicated generally at 31. It is the rotation of this one drive screw 28 which raises and lowers the entire platform.

The operation of the motor 30 is controlled by means of a switch 32 having an operating handle 33. When this handle is moved up the motor 30 is operated in a direction to raise the platform 1, whereas when the handle 33 is moved down the motor is operated in the reverse direction to lower the platform. In the central horizontal position of the handle 33 the motor is stopped.

Threaded on the drive screw 28 is a barrel nut 34 which fits inside a saddle 35 of inverted U shape. This saddle carries a pair of trunnions 36 which engage in notches 37 of inverted U shape formed in parts of an extension 38 which is provided on one of the cross members 7. This extension is a box-like structure which may be shaped as shown in the drawings. It includes inner and outer side plates, shown at 39, and it is in parts 40 of these plates which extend into the column 2 that the notches 37 are formed.

Figure 2:
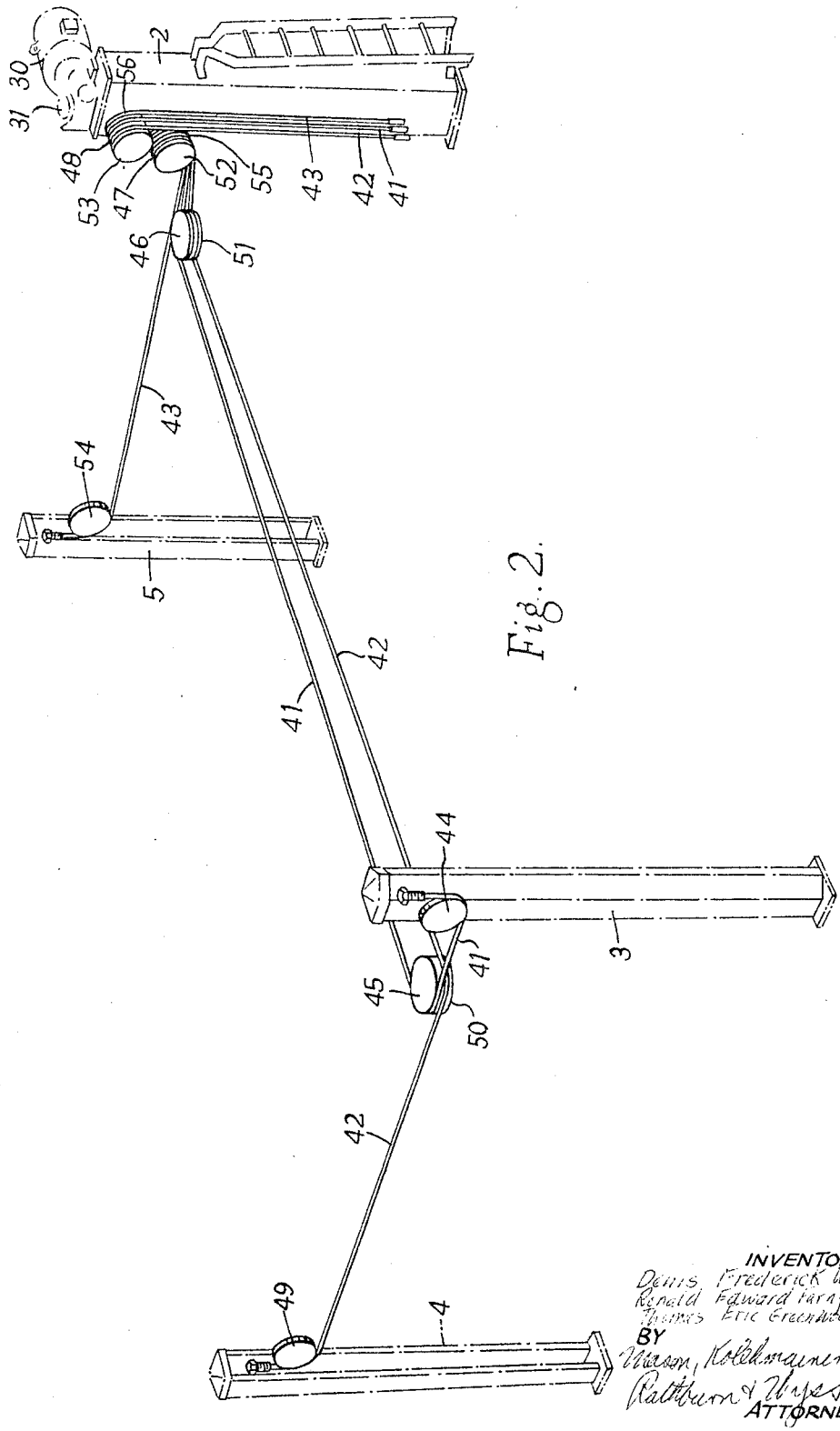
FIGURE 2 is a diagrammatic view showing a system of cables and pulleys which is used for supporting and raising and lowering the platform of the lift shown in FIGURE 1.

It will be seen that the screw 28, acting through the trunnions 36, supports one corner of the platform 1 directly. It also assists in the support of and effects the raising and lowering of the other three corners of the platform, which it does through a system of pulleys and cables which is best shown in FIGURE 2.

This system comprises three separate cables 41, 42 and 43 each of which is connected at one end to one of the columns 3, 4 and 5 and at its other end to an anchorage near the bottom of the column 2, which latter includes safety mechanism to be described.

Considering the cables in turn, the cable 41 is anchored at one end to the top of the column 3 and is then laid round pulleys 44, 45, 46, 47 and 48 to its anchorage at the bottom of the column 2. The cable 42, which is anchored to the top of the column 4, passes around the pulleys 49, 50, 51, 52 and 53 to the anchorage in the column 2, whilst the cable 43, which is anchored to the top of the column 5, passes round pulleys 54, 55 and 56 to the anchorage in the column 2.

All the pulleys referred to above are mounted on, or where possible in, the structure of the platform 1, where the pulleys 44, 49 and 54 are associated with additional safety mechanism which will be described. The cables all pass inside the cross members 7, whilst the cables 41 and 42 also pass along inside one of the hollow runways 6, between the top and bottom plates 12 and 13 and the channel members 10 and 11.

It may be noted that, although separate pulleys 46–51, 47–52–55 and 48–53–56 have been mentioned they may be in the form of double and treble pulleys, such as are shown in FIGURE 5.

The pulleys 47–52–55 and 48–53–65 are journalled on shafts, indicated generally at 57 and 58, which are mounted in the plates 39 of the extension 38.

The lengths of the cables 41, 42 and 43 are so adjusted that they hold the platform 1 level and it will be appreciated that upward or downward movement of the nut 34, which supports the extension 38, will raise or lower the four corners of the platform by equal amounts.

Referring now more particularly to FIGURES 3 and 4, the cables 41, 42 and 43 are anchored in the column 2 near the lower end of the latter to an anchorage in the form of a cross member 60. This is rigidly secured to an upright 61 which is of channel section. This upright 61 is rigidly secured in the open side of the column 2, which it closes except for a pair of slots through which the parts 40 of the side plates 39 of the extension 38 extend. An additional cross member 62 is also fitted to the upright 61 above the member 60.

As is best shown in FIGURES 3 and 4, the members 60 and 62 are slotted, the slots in the upper members 62 being of a size to accommodate the cables only, but the slots in the lower member 60 being larger to accommodate flanged plugs 63 fitted on the cables and also protective sleeves 64 (omitted from FIGURE 3). Compression springs 65 are fitted in these sleeves around the cables. These springs act between the plugs 63 and (through washers) the member 62. They thus force the plugs 63 against end members 66 which are secured to the ends of the cables 41, 42 and 43.

It will be appreciated that so long as the cables are under tension the end members 66 with their associated plugs 63 will be held against the anchorage member 60 with the springs 65 compressed.

Pivotally mounted on the upright 61 is a lever 67, one end of which is arranged to engage under an end of a second lever 68, which latter is pivoted at 69 to a suitable support 70. At its other end the lever 68 is connected to a safety switch rod 71, the upper end of which is slidably mounted in a bracket 72 fitted in the column 2 near the top of the latter. The rod 71 carries a cam 73 which is arranged to operate a microswitch 74. This latter is connected in a control circuit for the motor 30 and the arrangement is such that any downward movement of the rod 71 operates the switch 74 to stop the motor.

The lever 67 carries a lateral extension 75 in which are fitted a number of screws 76. The positions of these are adjusted so that their heads engage under the end members 66. So long as all the cables 41, 42 and 43 are held under tension by the weight of the platform which they support, they will hold the members 66 in their uppermost positions, against the force of the springs 65, and the levers 67 and 68 will be left in the positions shown. Should, however, any one of the cables 41, 42 and 43 break, or should downward movement of the corner of the platform which is supported by one of these cables be prevented through the platform striking an obstruction, then the end member 66 of that cable will be forced by its spring 65 downwardly against the corresponding screw 76. This, acting through the levers 67 and 68 and the rod 71 will operate the microswitch 74 to stop the motor.

In addition to the safety mechanism already described the drive column 2 also contains mechanism for limiting upward and downward movement of the platform. This mechanism comprises a lever 80, which is mounted on the same shaft of the switch 32 as the handle 33 and which supports a rod 81. This it does by means of a pin 82 which is mounted on the lever 80 and which engages in a slot 83 formed in a bar 84 to which the upper end of the rod 81 is attached. The connection may include a screwed sleeve 85 which enables the effective length of the rod 81 to be adjusted.

At its lower end the rod 81 carries a stop 86. This is in the form of a collar which is supported by nuts 87, which enable the position of the stop on the rod 81 to be adjusted.

The rod 81 passes through a loop 88 carried by a lever 89, which lever is pivoted at 90 to part of the saddle 35. This lever 89 is also formed with a loop 91 where it passes round the rod 71.

The lever 89 includes an extension 92 which is acted upon by a spring 93, which latter is also carried by the saddle 35. When this corner of the platform 1 is supported by the parts 40 of the extension 38 engaging the trunnions 36, as will be the case during all normal working, the part 92 of the lever 89 will be held by the spring 93 pressed against a projection or nose 94 which is provided on one of the parts 40 of the extension plates 39. With the lever 89 in the resulting horizontal position the loops 88 and 91 will run freely up and down the rods 81 and 71 without actuating the latter, except that when the platform reaches its lowermost position (when being lowered) the loop 91 will engage the collar 86 and will draw the rod 81 downwardly. This, acting through the lever 80, will return the switch 32 to its "off" position, stopping the platform.

Similarly, when the platform is travelling upwardly and nears the uppermost limit of its travel the loop 91 will engage a stop provided by the lower end of the sleeve 85, thus causing the rod 81 with the bar 84 to travel upwardly. Once this movement has completed the length of the slot 83 the lever 80 and switch 32 will be operated to switch off the motor.

Should the platform, whilst being lowered, meet an obstruction near the drive column 2, then this obstruction will prevent the platform from continuing downwardly. However, the motor 30 will continue to drive the screw 28 and consequently the nut 34 and saddle 35 will continue to move down. As a result of this the trunnions 36 will move away from the plates 39 of the extension 38 but the spring 93 will continue to act on the lever 89. As a result the lever 89 will pivot, cocking the loop 92 relatively to the rod 71. The loop 92 will then act as a ring clutch on the rod 71 so that the latter will be drawn down with the saddle 35. As a result, the microswitch 74 will be operated to switch off the motor.

Figure 8:
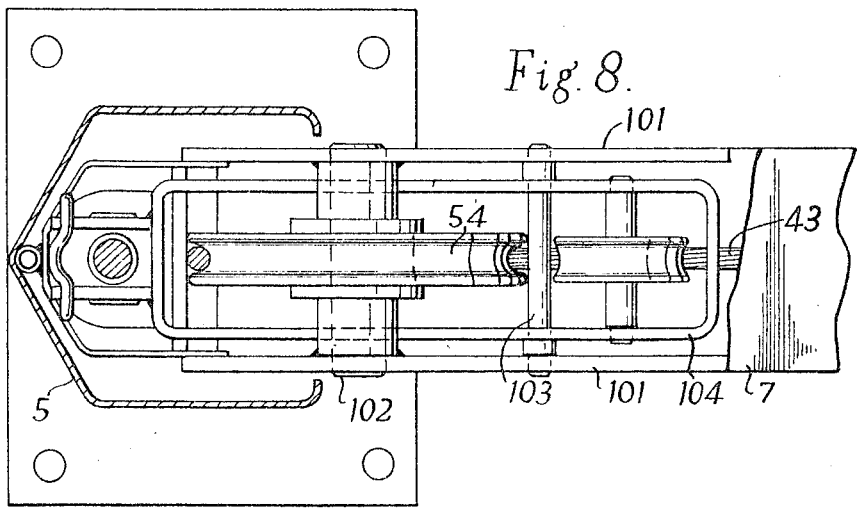
FIGURE 8 is a horizontal section taken on the line A—A of FIGURE 7.
Figure 7:
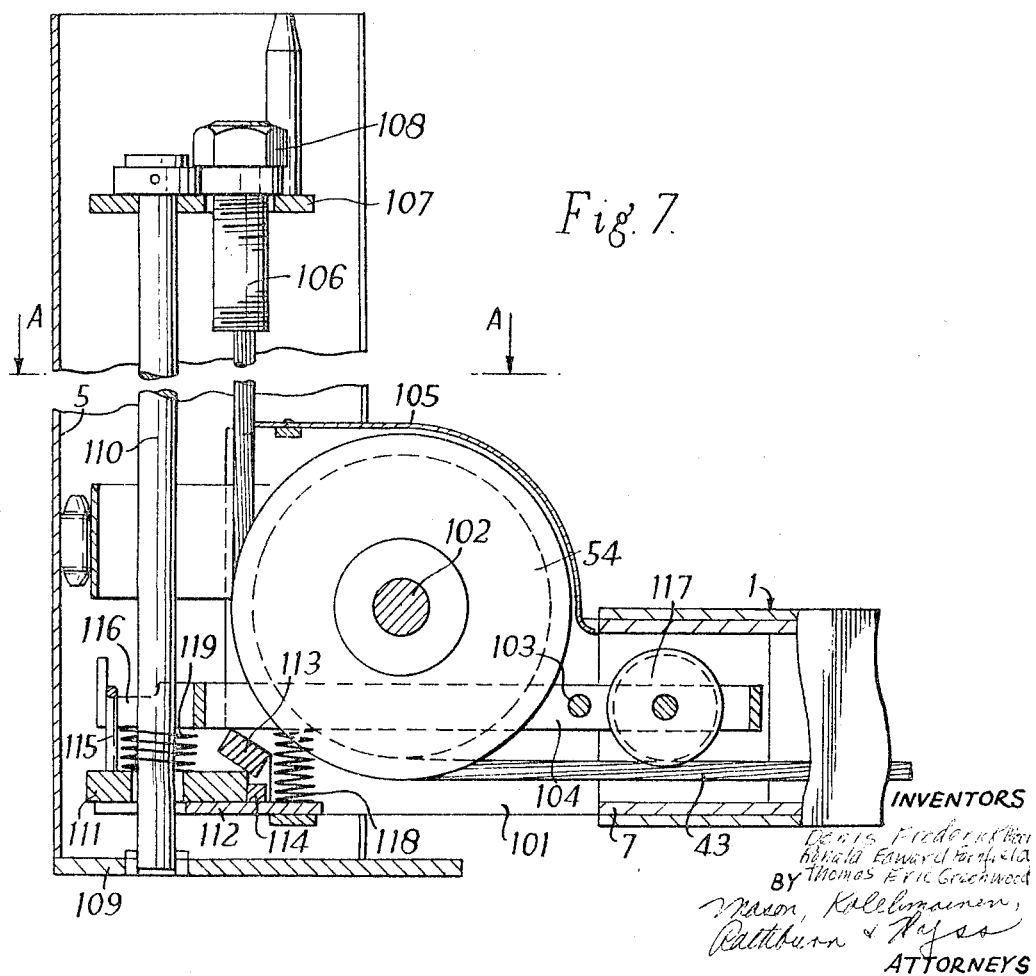
FIGURE 7 is a vertical sectional view, again to a larger scale, showing parts of the column and safety mechanism which are provided at one of the corners of the platform remote from the drive.

Referring now to FIGURES 7 and 8, these show how the corners of the platform 1 remote from the drive column 2 are supported, whilst they also show the additional safety mechanism which is provided at these points. The corner of the platform 1 which is supported by the column 5 is shown, but the constructions are similar for the columns 3 and 4.

The column 5, and also the columns 3 and 4, are hollow, preferably being formed of sheet steel which is folded or bent to the shape shown. In this way the columns are closed except for openings along one of their sides, through which extensions of the cross-members 7 of the platform, and also the cables, pass to anchorages and safety mechanisms which are fitted within the columns.

Referring to FIGURES 7 and 8, the extension of the member 7 is provided by two plates 101, one of which could be formed integrally with the cross-member itself. Journalled in the plates 101 is a shaft 102 carrying the pulley 54 and also a further shaft 103 on which a frame-like lever 104 is pivoted. A cover 105 (omitted from FIGURE 8) covers the pulley 54 and the associated mechanism.

The end of the cable 43 has a threaded sleeve 106 secured to it. This sleeve passes through a cross member 107 fitted in the colum 5 and carries a nut 108 to anchor the end of the cable. This nut can be used to adjust the length of the cable 43 to ensure that the platform 1 is supported horizontally.

Extending vertically along the column 5 between the cross member 107 and the base 109 of the column is a safety rod 110. This is surrounded by a clutch ring 111 which rests on a plate 112; this plate is secured to and extends between the plates 101 of the platform 1. Cross members 113 and 114, which are also secured to and extend between the plates 101, position the clutch ring 111 and limit the upward angular movement of the latter.

A loop 115 is secured to the ring 111 and passes over an end part 116 of the lever 104. The other end of this lever carries a roller 117 which bears on the cable 43. A compression spring 117 is fitted between the plate 112 and the lever 104 and causes the roller 117 to press down on the cable 43, while an additional spring 119 assists in pressing this end of the lever up and the roller 117 down against the cable 43 but its main object is to press downwardly on the clutch ring 111 so as to hold the latter in its lower position, in which it does not engage the rod 110.

So long as the cable 43 is held under tension, due to the weight of the platform which it is assisting to support, the lever 104 and the clutch ring 111 will remain in their horizontal positions, as shown in FIGURE 7, thus allowing free up and down movement of the platform. Should, however, the cable 43 so slack, due to breakage of the cable or to the platform hitting an obstruction while it is being lowered, the spring 118 will force this end of the lever 104 upwardly. This, acting through the loop 115, will pull up one side of the clutch ring 111, thus causing it to bite on the rod 110 and stop any further downward movement of this corner of the platform.

The loss of tension in the cable 43 will, at the same time, actuate the safety mechanism in the column 2 to stop the drive motor.

A number of modifications are possible to the lift and safety mechanisms which have been described.

A modified safety mechanism, which could be used in place of that shown in FIGURES 7 and 8, might comprise a roller (corresponding to the roller 117) which is mounted on a lever or frame which is pivoted to the platform and which carries a roller corresponding to the roller 117. A spring holds this roller pressed against the cable.

A second lever or frame is also provided, pivoted to the platform, which may be done using the shaft of the pulley 54 as a pivot. This frame carries a ring clutch which is rigidly secured to it and which corresponds to the ring clutch 111.

The two pivoted frames are operatively connected together by a link or other suitable arrangement in such a way that, should the cable go slack, the spring holding the roller in contact with the cable will cause both the frames to pivot. As a result of pivoting of the frame carrying the ring clutch the latter will be caused to bite into the safety rod 110, thus preventing further downward movement of the platform.

It is also possible to provide a further safety device for arresting the downward travel of the platform if the threads on the actuating nut 34 or the screw 28 become worn or broken. One such safety device may comprise a split nut which is arranged to clamp onto the screw 28 in the event of breakage or wear of the actuating nut 34 or the screw, itself, thereby providing a large load upon the motor which will bring into operation an overload release or fuse provided for the motor.

The platform 1 may take a number of different forms. Thus, the walkways and railings may be omitted, in which case the platform might comprise a pair of narrower runways for the vehicle wheels. These runways would be supported and spaced apart at their ends by a pair of cross members, which would take the place of the cross members 7.

We claim:

1. A lift for vehicles and the like, said lift comprising a platform, means including a plurality of cables for supporting said platform in a substantially horizontal position, a drive for raising and lowering said platform, and safety mechanism, which mechanism includes at least one actuating member, means responsive to operation of said actuating member to stop the said drive, a plurality of end members each of which is connected to one end of one of said cables, and means biasing each of the said end members against the tension of its cable in a direction to operate said actuating member, such that a loss of tension in said cable causes its said end member to operate said actuating member to stop the drive.

2. A lift according to claim 1 in which the biasing means for each of said cables includes a fixed abutment and a helical compression spring which surrounds the end of said cable and is compressed between the end member of that cable and said abutment.

3. A lift according to claim 1, which includes safety devices each of which is responsive to a loss of tension in one of said cables for preventing downward movement of a part of the platform which was supported by that cable, each of which safety devices includes a vertical rod, a ring clutch surrounding said rod, a plate defining a stop for said ring clutch, a safety lever, pivot means pivotally mounting said lever intermediate its length, means along said lever on one side of said pivot for riding on a run of a respective one of said cables, spring means biasing the last mentioned means into engagement with said cable, said lever rocking about said pivot means if said cable becomes slack, connecting means connecting said lever along its other side with said ring clutch, and spring means interposed between said lever and said ring clutch normally biasing said clutch against said plate out of engagement with said rod and effective upon rocking of said lever to wedge said ring clutch into biting engagement with said rod.

References Cited by the Examiner

UNITED STATES PATENTS 2,843,223    7/1958    Villars _____ 187—8.47

FOREIGN PATENTS 1,373,110    10/1963    France.
724,511    2/1955    Great Britain.

EVON C. BLUNK, *Primary Examiner.*

H. C. HORNSBY, *Assistant Examiner.*